(Specimens.)
T. A. WILLARD.
BATTERY PLATE.
No. 576,178. Patented Feb. 2, 1897.
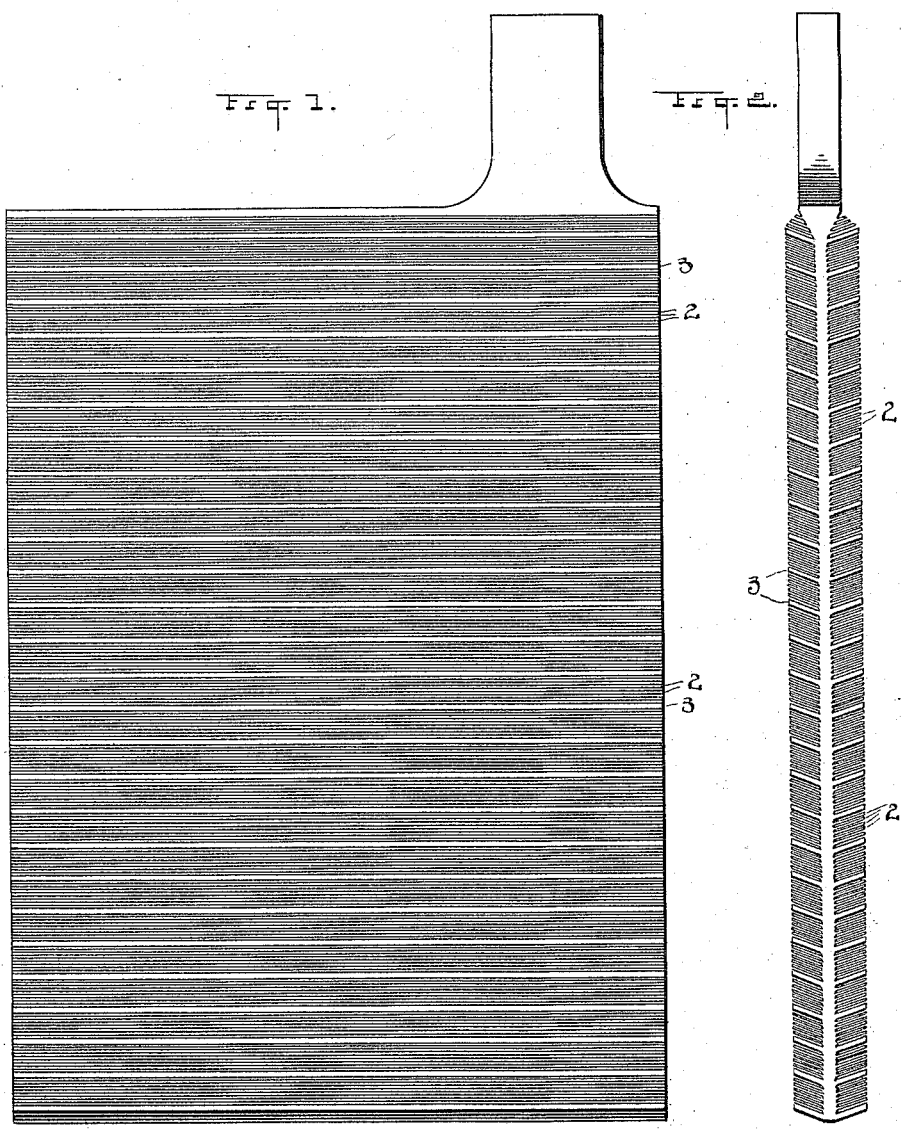
ATTEST
D. B. Moser
H. E. Mudra
INVENTOR.
Theadore A. Willard
By H. J. Fisher ATTY

UNITED STATES PATENT OFFICE.

THEADORE A. WILLARD, OF CLEVELAND, OHIO.

BATTERY-PLATE.

SPECIFICATION forming part of Letters Patent No. 576,178, dated February 2, 1897.

Original application filed May 4, 1896, Serial No. 590,176. Divided and this application filed August 26, 1896. Serial No. 603,944. (Specimens.)

*To all whom it may concern:*

Be it known that I, THEADORE A. WILLARD, a citizen of the United States, residing at Cleveland, in the county of Cuyahoga and State of Ohio, have invented certain new and useful Improvements in Battery-Plates; and I do hereby declare that the following is a full, clear, and exact description of the invention, which will enable others skilled in the art to which it appertains to make and use the same.

My invention has reference to battery-plates; and the invention consists in a battery-plate composed of any suitable metal or composition or combination of metals or material and which has its surface converted into thin leaves before undergoing electrical action, all substantially as shown and described, and particularly pointed out in the claims.

In the accompanying drawings, Figure 1 is a side elevation of one form or style of plate embodying my invention. Fig. 2 is an edge elevation thereof.

In the production of a battery-plate according to my invention I start with what is preferably a plain plate of lead of suitable thickness, although other material may be used, as already indicated, and reduce the surfaces of said plate into very thin leaves or shavings 2, running transversely of the plate and cut to greater or less depth, as may be preferred. To produce these leaves or shavings of a desirable depth, they are cut at an inclination to a vertical plane and thrown down from this plane preferably to position about as shown, as thereby the active material developed from the leaves themselves is more easily and positively held in place. Then as a means of support for the said material I provide the plate with an occasional shelf or rib 3, which has the same inclination as the leaves, but is of such thickness that it will withstand electrical action and remain as a permanent support for the material immediately above the same.

A distinguishing and altogether novel feature of this plate is, first, the leaves 2, which are shaved by a suitable tool from the surface of the plate, and are not only uniform in thickness with one another and in themselves from their extreme edge to their base, like the leaf of a book, but are further distinguished and novel in that they have uniform space between them from their extreme edge to their base. This space is designed to be just sufficient to accommodate the active material produced by the electrical conversion or reduction of the leaves 2, so that when said leaves are thus converted we have, as a result, a spongy, cellular, absorbent mass, uniform in quality and density from shelf to shelf and across the plate and uniform as well on both sides of the plate; but if the leaves 2 are not sufficiently spaced and the plate is forced in forming it may occur that the active material will become so closely packed between the shelves that the plate will grow perceptibly higher, being crowded up by the expanding material.

The active material developed in this plate is uniform the full depth of the leaves, because the leaves themselves are uniform and have uniform spaces into which to expand. This uniform development and finish of the plate could not occur if the leaves varied in thickness or were deeper at their base than at their edge. If this latter were true, there would necessarily be the least room for expansion where the most active material would form, and as a consequence the excess of such material would be crowded out and cast off at the surface. Then again the thin edges would form first and shed while the material from within pressed forward and would shed in turn; but with uniformly thin and even leaves and room between them for the active material to expand where it is produced the material shows no disposition to work to the surface of the plate or to separate therefrom, and the shelves or ledges 3 hold it in place through all possible exposures and uses of the battery. It occurs, therefore, when the current is turned on and the plate forms that it forms with layers upon each side of the leaves, and these layers grow and spread until all the open space between them is taken up and the leaves themselves are after a protracted use at last practically or wholly consumed in this way.

The leaves 2 can be made as thin as ordinary letter-paper, if desired, and generally they are not thicker than a common United States postal card.

One or both sides of the plate can be shaved into leaves, as preferred. In the present case I provide a shelf or support 3 for about every five to eight leaves, and these shelves or supports are cut and turned into position the same as the leaves, but retain such angle and strength as to perfectly serve their purpose of keeping the active material in place without other means of confinement.

In my application filed May 4, 1896, Serial No. 590,156, I show and describe a machine designed to produce a battery-plate with leaves as described and claimed in the present application. In said application one of the features of the invention is a tool constructed to shave and raise the leaves, and means following the said tool adapted to finish the edges of the leaves, so that the bevel and feather upon the said edges which may be produced in the cutting and lifting operation will be removed and the leaves left perfectly uniform in thickness from the extreme edge thereof to their base, thereby avoiding the objection of shedding or casting off such beveled or feathered portions when the battery is formed.

I claim—

1. A battery-plate having its sides provided with extremely thin parallel shaved leaves of equal thickness from the extreme edge to the base thereof and with a uniform space between the said leaves from their extreme edge to their base in which the material is enabled to form and expand, substantially as described.

2. A battery-plate having its sides provided with extremely thin parallel shaved leaves of equal thickness from their extreme edge to their base and with uniform space between said leaves from their extreme edge to their base in which the material is enabled to form and expand, and supporting-ribs at intervals between the said leaves, substantially as described.

Witness my hand to the foregoing specification this 1st day of August, 1896.

THEADORE A. WILLARD.

Witnesses:
H. T. FISHER,
R. B. MOSER.